Feb. 2, 1926.
P. LE R. McCALL
APPARATUS FOR FORMING PAPER CONES
Filed Feb. 7, 1924   2 Sheets-Sheet 1
1,571,852
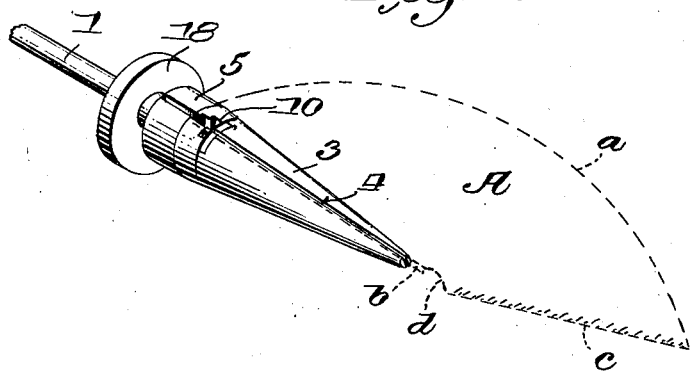
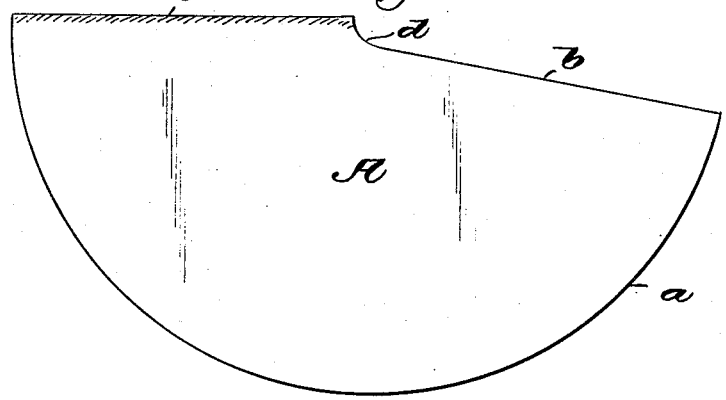
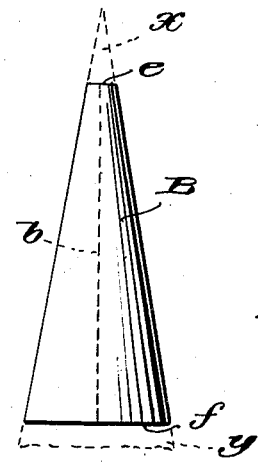
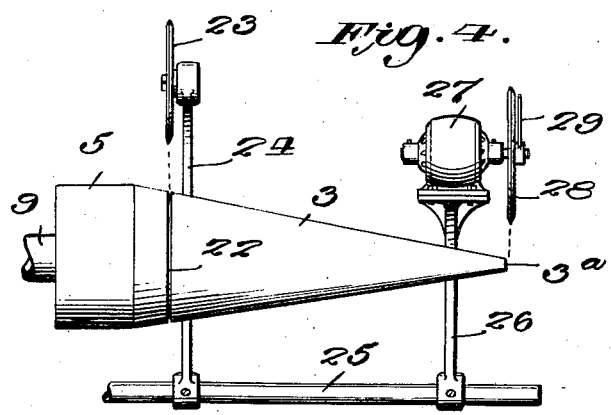
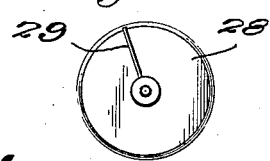

Feb. 2, 1926. 1,571,852
P. LE R. McCALL
APPARATUS FOR FORMING PAPER CONES
Filed Feb. 7, 1924 2 Sheets-Sheet 2
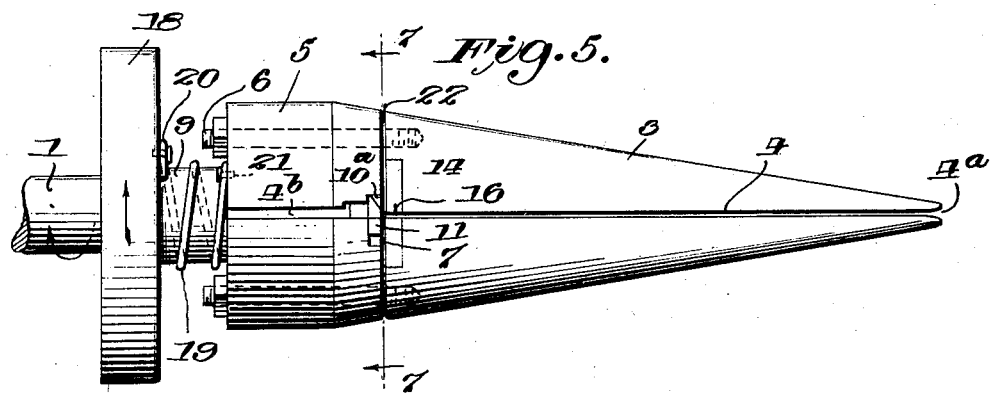
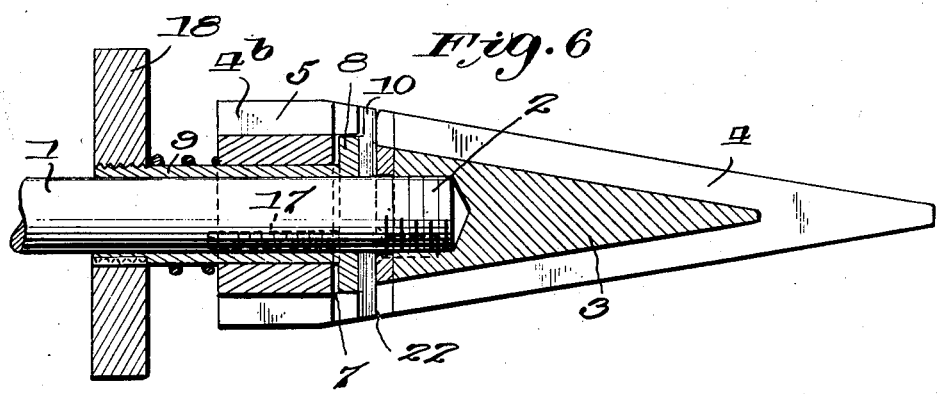
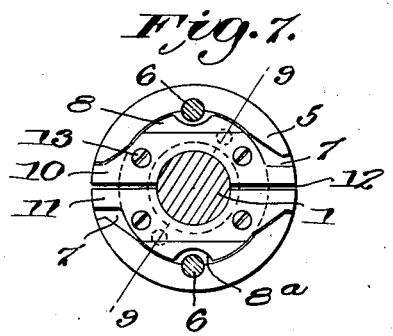
Inventor
P. L. McCall,
By Prentiss, Stone & Bayden,
Attorneys.

Patented Feb. 2, 1926.

1,571,852

UNITED STATES PATENT OFFICE.

PETER LE ROY McCALL, OF ROCKINGHAM, NORTH CAROLINA.

APPARATUS FOR FORMING PAPER CONES.

Application filed February 7, 1924. Serial No. 691,288.

*To all whom it may concern:*

Be it known that I, PETER LE ROY MC-CALL, a citizen of the United States, residing at Rockingham, in the county of Richmond and State of North Carolina, have invented certain new and useful Improvements in Apparatus for Forming Paper Cones, of which the following is a specification.

This invention relates to the manufacture of cones and tubes such as are used by cotton mills for winding yarns, and more particularly to the manufacture of cones from sector-shaped paper blanks.

In making such cones, a rotary conical mandrel is employed, such mandrel having a longitudinally extending slot in its surface, into which slot one edge of the sector shaped blank is inserted, so that, as the mandrel revolves, the blank, having been previously coated with adhesive, is wound upon the mandrel to form a cone.

Before such cones are marketable, it is necessary to trim both the large and small ends thereof to provide a smoothly finished article having a relatively blunt point. Heretofore, it has been the common practice to remove the cones from the mandrel after they are wound and place them on a special cutting or trimming machine. This separate trimming operation was rendered necessary for the reason that the edge portion of the blank which lay in the slot of the forming mandrel could not be severed by the usual cutter disks and no method of clipping or cutting this edge portion was known.

It has also been proposed to form cones by means of a blank having a relatively short tongue projecting from one of the straight edges thereof, which tongue is received in the slot in the mandrel, as shown, for example, in Smith Patent No. 886,884, dated May 5, 1908. When using this method, the cutting or trimming of the cone took place at the points beyond the ends of this tongue, the result being that there was no uncut edge remaining in the slot, and in this way, it was possible to trim the cones on the same mandrel on which they were wound. This method, however, proved somewhat defective. In the finished cone, the tongue above referred to, which lies on the inside of the cone, did not extend the full length of the cone but terminated short of the base thereof, thus producing a thin or weak spot in the base portion of the cone, which is objectionable.

The general object of the present invention is to provide an improved means for and method of manufacturing cones and the like, whereby the edge which lies in the slot in the mandrel extends the full length of the cone, thus producing a structure of uniform strength and thickness throughout, while at the same time, the wound cone may be trimmed or cut at both ends, while in position on the mandrel on which it is formed, thus obviating an additional cutting operation.

To this end. I have devised means by which the edge portion of the blank which lies in the slot may be automatically cut or clipped at the same time that the usual disk cutter is operating on the body of the cone, whereby the section which is trimmed off is completely severed from the cone. Auxiliary objects of the invention are to provide improved means for thus cutting or clipping the edge portion of the blank, which shall be simple in construction and durable and efficient in operation.

A further object is to devise a method and means for trimming the small end of the cones, whereby no special clipping means for the edge portion of the blank is required, but whereby the small end of the cone may be completely severed by means of a single cutter.

In order that the invention may be readily understood, reference is had to the accompanying drawings, forming part of this specification, and in which:—

Figure 1 is a perspective view of my improved mandrel, showing, in dotted lines, a paper blank about to be wound thereon;

Figure 2 is a plan view of the improved blank which I prefer to employ;

Figure 3 is a side elevation of one of the finished cones as made on my improved mandrel, the shape of the cone before trimming being indicated by dotted lines;

Figure 4 is a side elevation of the mandrel and the improved cutting mechanism in position to cooperate therewith;

Figure 4ᵃ is a face view of one of the cutters shown in Figure 4;

Figure 5 is a side elevation on an enlarged scale showing the details of construction of my improved mandrel;

Figure 6 is a central horizontal section through the mandrel shown in Figure 5;

Figure 7 is a transverse section on the line 7—7 of Figure 5, looking in the direction of the arrows;

Figure 8 is a transverse section on the same line, looking in the opposite direction;

Figure 9 is a transverse section on the line 9—9 of Figure 7; and

Figure 10 is a perspective view of my improved auxiliary cutter or shear employed for clipping the edge of the blank.

Referring to the drawings in detail, and more particularly to Figures 1 and 2, I employ, as has heretofore been proposed, a sector-shaped paper blank A having an arcuate edge $a$ and two straight, substantially radial edges $b$ and $c$. The edge $c$ is what is known as a deckle edge, that is to say, an edge which is beveled off so as to be exceedingly thin. In order to avoid undue accumulation of the paper stock at the apex of the cone, I preferably cut away the edge $b$ adjacent the center, as indicated at $d$.

As shown in Figure 1, my improved mandrel 3 is mounted upon a spindle 1 and is provided with a longitudinally extending slot 4, in which one edge of the sector-shaped blank A is inserted prior to the winding operation. It will be particularly noted that it is the plain or thick edge $b$ which is inserted in the slot 4, the deckle edge $c$ remaining free and serving to form the outside seam when the cone is wound, so as to produce a smooth and almost invisible joint.

It will be obvious that if an attempt were made to cut or trim the cone wound upon the mandrel 3, by means of an ordinary disk cutter such as has heretofore been employed, the edge portion $b$ of the blank which lies within the slot 4 would remain uncut, and that the section trimmed off from the base of the cone would not be completely severed. In order to overcome this difficulty, I have devised the plan of using an auxiliary cutter or shear constructed and arranged to clip the edge of the blank which lies within the slot. In order that this may be clearly understood, reference is now had in detail to Figures 5 to 10, inclusive.

Referring to these figures, it will be seen that the spindle 1 has a screw threaded end 2 which is received in a socket in the end of the cone-shaped mandrel 3, such mandrel being preferably provided with a pair of diametrically opposite longitudinally extending slots 4. These slots merge into each other toward the small end of the mandrel, so as to constitute, in effect, but a single slot extending entirely through the apex portion. The extreme end of this slot is preferably somewhat widened, as indicated at 4ª in Figure 5, to facilitate the entrance of the blanks into the same. Cooperating with and forming a continuation of the cone-shaped portion 3 of the mandrel is a base portion 5, rigidly connected with the portion 3 by means of two or more machine bolts 6. The section or portion 5 is also provided with a pair of diametrically opposite longitudinally extending slots 4ᵇ, which form a continuation of the slots 4, as clearly shown in Figures 5 and 6.

Mounted between the sections 3 and 5 of the mandrel is the auxiliary shear or clipping device, which I shall now describe. A sleeve 9 is journaled upon the spindle 1, being interposed between such spindle and the base section 5 of the mandrel, and carries at its forward end a disk shaped head 8. Set into a recess in the front face of the head 8 is a pair of shear members or blades 10 and 11, secured by means of screws 13, and separated by a transversely extending space or slot 12, substantially equal in width to that of the slot 4. The head 8 and associated blades 10 and 11 are received in a recess 7, formed in the forward end of the base section 5 of the mandrel, as will be seen by reference to Figures 6, 7 and 9, the length of the blades 10 and 11 being substantially equal to the diameter of the mandrel at this point, so that the extreme ends of these blades are substantially flush with the surface of the mandrel.

Set into the rear face of the mandrel section 3 adjacent the shear blades 10 and 11, is a wear plate 14, formed of hardened steel and held in position by screws 15. This wear plate is provided with opposite notches or recesses 16, which aline with and form a continuation of the solts 4, as clearly shown in Figures 5 and 6.

It will now be apparent that the blades 10 and 11 cooperate with the wear plate 14, to form shears, one end of such blades being preferably beveled or ground to a triangular section, as shown at 10ª in Figures 5 and 10, so that they may be readily sharpened.

In order to hold the blades 10 and 11 in close contact with the wear plate 14, so as to insure proper shearing action, I provide adjusting screws 17 (see Figure 9) which bear against the rear face of the head 8. By tightening up these screws, it is obvious that the head and associated blades may be forced toward the wear plate 14, as closely as desired.

Secured to the rear end of the sleeve 9, is a heavy disk 18, which is in the nature of a fly wheel, and constitutes a momentum device for actuating the shear blades, as will now be described. A light torsional spring 19 is secured at one end to the wheel 18, as shown at 20 in Figure 5, and after passing around the sleeve 9 several times, is secured at its other end to the base section 5 of the mandrel, as indicated at 21. Obviously, the action of this spring is to urge the wheel 18 in the direction indicated by the arrow in Figure 5, thus holding the blades 10 and 11 in the position shown in said figure, in which position the slot 12 between said blades, registers with the slots 4 and 16 so as to provide a continuous open passageway for the reception of the edge of the blank. It will be understood that the recess 7, adjacent the surface of the mandrel, is sufficiently larger than the ends of the blades 10 and 11, to permit said blades to have a limited rocking movement, relative to the mandrel, and it will also be understood that the edges of the disk shaped head 8 are cut away adjacent the bolts 6, as indicated at 8ª in Figures 7 and 10, so as to permit such oscillating or rocking movement.

As usual in this class of apparatus, the spindle 1, and the mandrel to which it is rigidly attached, are driven intermittently by means of mutilated gears or any other suitable mechanism. That is to say, the spindle is given a certain number of revolutions and is then brought to a sudden stop, after which it is again rotated, and so on. Assuming that the direction of rotation of the spindle is in the direction indicated by the arrow in Figure 5, it will be apparent that when such spindle is suddenly started, the fly wheel 18, due to its inertia, tends to lag behind. This tendency results in the mandrel running ahead of the fly wheel, thus causing a momentary relative angular displacement of the sleeve 9, carrying the shear plates 10 and 11, and the mandrel, carrying the plate 14. As a consequence, the end 10ª of the blade, as shown in Figure 5, is caused to move across the slot 4 and 16, thereby shearing the edge portion of the paper blank which lies in such slot.

The angular displacement of the shear blades and mandrel is, however, very small, being limited by the walls of the recess 7, in which these blades are housed. When the spindle suddenly stops, the momentum of the fly wheel causes it to overrun, thus throwing the blades back to the relative position illustrated in Figure 5, in which position they are retained by the spring 19, thereby again bringing the slots into line. This has two functions. Not only is the slot thus opened up for the reception of a new blank, but as the blades swing back to normal position, the end 11ª of blade 11, which is preferably square, as shown, engages the edge portion of the severed section of the blank, and pushes it back into line with the slot so that such severed section can be readily slipped off of the mandrel and removed along with the finished cone. In this connection, it will, of course, be understood that the usual cutting disk, herein-after described more in detail, operates upon the cone in the plane of the groove 22 between the sections 3 and 5 of the mandrel, and it will be seen that the shearing blades 10 and 11 operate to clip the edge portion of the blank in the slot in exactly the same plane as that in which the main cutter operates, namely, in the plane of the groove 22. Thus, the edge portion of the blank is clipped by the shear blades at a point which exactly co-incides with that at which the main body of the cone is trimmed by the usual cutter, thus completely severing all portions of the cone at substantially a single operation.

Referring to Figure 4, the usual cutter disk, above referred to, for trimming the base end of the cone, is illustrated at 23, and is shown as mounted upon an arm 24, secured to a rock shaft 25. This shaft is rocked by suitable mechanism in proper timed relation, so as to bring the cutter disk 23 into contact with the cone, after the same has been wound upon the mandrel.

In order to trim the small end or apex portion of the cone, I provide a second disk cutter 28, mounted upon an arm 26, also secured to the rock shaft 25. This cutter 28 is independently driven by means of an electric motor or the like 27, and is so positioned that, when the shaft 25 is rocked, it moves past and just clears the small end 3ª of the mandrel. Thus, while the cutter 23 is brought into contact with the rotating cone, and is driven by friction only, as in prior apparatus, my improved cutter 28 for trimming the small end of the cone is driven by an independent motor and cuts the cone at a point just beyond the end of the mandrel.

I have found, in practice, that when cutting off the small ends of cones in this manner, there is a tendency for the severed section to fly or be hurled upward or sideways, to the great discomfort of the operator. In order to prevent this, and to cause the severed apex section of the cone to be impelled or thrown downwardly, I attach to the hub of the cutter disk 28, a finger 29, preferably formed of resilient wire, and extending almost to the periphery of the cutter disk. I have found that the end of this finger will strike against the severed section and throw or impel it downwardly, thus preventing it from being hurled in any other direction. This, of course, is due to the fact that the cutter disk and finger are located above the mandrel and engage the cone from the upper side.

Referring to Figure 3, the finished cone is designated by the letter B. At y is shown the more or less irregular section which has been trimmed from the base of the cone by the cutter 23, and shears 10 and 11, thus producing a smooth straight edge f. At x is indicated, in dotted lines, the apex portion which is cut or trimmed from the cone by the cutter 28, thus leaving a flat smooth end e. This is subsequently usually rounded by a special machine.

It will be particularly noted, by reference to Figure 3, that the edge b of the blank which forms the inner seam of the cone, extends along the entire length of the finished cone from top to bottom, thus, producing a cone of uniform strength and thickness throughout. This is regarded by the mills as a distinct advantage.

To briefly summarize, the operation of my improved apparatus is as follows. A blank having been first coated with adhesive is placed in position on the mandrel, by well known mechanism, with its thick edge received in the slot 4, as shown in Figure 1. The spindle 1 is then given a suitable number of revolutions, usually six or eight, thus winding the blank upon the mandrel and causing all layers thereof to securely adhere to each other. Then the shaft 25 is rocked, thus bringing the cutter 23 into contact with the cone near the base, and moving the motor driven cutter 28 past the small end of the mandrel, by this means trimming both ends of the cone. Finally, the mandrel is brought to a sudden stop, thus causing the fly wheel 18 to operate the shear blades 10 and 11, as above described, thereby finally severing the edge portion of the blank which was in the slot. The completed cone, together with the severed base section is then stripped off of the mandrel, and another blank drawn into position, and the operation repeated. It will be understood that the above described series of steps are carried out by means of an automatic machine of which my improved mandred forms a part, the machine operating at such speed as to be capable of producing ten to twelve thousand cones a day. Since the machine itself and the mechanism for cutting and feeding the blanks, driving the mandrel and associated parts and stripping the cones from the mandrel, are well known, they need not be described here. The present invention relates only to the provision of means for clipping the edge of the blank which lies in the slot and in the other improved details shown and described in connection with the accompanying drawings.

By reference to Figure 10, it will be observed that the shear blades 10 and 11 are similar but reversed, that is to say, each has a triangular cutter at one end, as shown at 10ª, and a square or rectangular pusher at the other end, as indicated at 11ª. Thus, the blade assembly is symmetrical and a similar cutting action takes place regardless of which of the two diametrically opposite slots 4 is used. In practice, it is preferable to employ these two slots alternately.

Referring to Figure 2, it will be noted that while the edges b and c of the blank are substantially radial straight lines, still the edge b which is received in the mandrel slot lies somewhat inside of a true radial line, so as to enable the cutting away of part of the blank, as indicated at d, in order to prevent too great an accumulation of material at the apex of the cone.

While I have illustrated and described my improved arrangement of auxiliary shearing blades as applied to the manufacture of cones, it will be understood that it is applicable also to the manufacture of cylindrical convolute tubes from rectangular paper blanks.

What I claim is:—

1. The combination with a rotary mandrel having a longitudinal slot to receive the edge of a blank to be wound thereon, of means for transversely severing the wound blank completely, including the edge which is located in the said slot.

2. The combination with a rotary mandrel having a longitudinal slot to receive the edge of a blank to be wound thereon, of a cutter for transversely severing the wound blank while on the mandrel, and an auxiliary cutter for severing the edge portion of the blank lying in said slot.

3. The combination with a rotary mandrel having a longitudinal solt to receive the edge of a blank to be wound thereon, of a cutter for transversely severing the wound blank while on the mandrel, and a shearing device for severing the edge portion of the blank lying in said slot.

4. The combination with a rotary mandrel having a longitudinal slot to receive the edge and a blank to be wound thereon, of a cutter for transversely severing the wound blank while on the mandrel, and a shearing device located inside of said mandrel for severing the edge portion of the blank lying in said slot.

5. The combination with a rotary mandrel having a longitudinal slot to receive the edge of a blank to be wound thereon, of a cutter for transversely severing the wound blank while on the mandrel, and an auxiliary cutter, operating in the same plane as the main cutter, for severing the edge portion of the blank lying in said slot.

6. The combination with a rotary mandrel having a longitudinal slot to receive the edge of a blank to be wound thereon, of a cutter for transversely severing the wound blank while on the mandrel, and a shearing device brought into operation by the starting of the mandrel, for severing the edge portion of the blank lying in said slot.

7. The combination with a rotary mandrel having a longitudinal slot to receive the edge of a blank to be wound thereon, of a cutter for transversely severing the wound blank while on the mandrel, and a momentum operated shearing device for severing the edge portion of the blank lying in said slot.

8. The combination with a rotary mandrel having a longitudinal slot to receive the edge of a blank to be wound thereon, of a cutter for transversely severing the wound blank while on the mandrel, and a shearing device, carried by said mandrel and operating in the same plane as said cutter, for severing the edge portion of the blank lying in said slot.

9. In a device of the class described, a rotary conical mandrel having a pair of diametrically opposite, longitudinally disposed slots in its surface to receive the edge of a blank to be wound thereon, said slots extending throughout the length of the mandrel and merging into each other adjacent the apex of the cone so that they extend entirely through the body thereof.

10. In a device for forming cones from sector shaped paper blanks, the combination with a rotary conical mandrel having a longitudinal slot therein to receive the edge of a blank to be wound thereon, of a cutter for trimming a section from the base end of the wound cone while on the mandrel, and an auxiliary cutter, operating in the same plane as the main cutter, for clipping the edge portion of the blank lying in said slot, whereby the section trimmed off is completely severed from the cone.

11. In a device for forming cones from sector shaped paper blanks, the combination with a rotary conical mandrel having a longitudinal slot therein to receive the edge of a blank to be wound thereon, such edge extending throughout the length of the cone, of means for trimming a section from the base end of the wound cone, while on the mandrel, in such manner that said section, including the edge lying in the slot, is completely severed.

12. In a device for forming cones from sector shaped paper blanks, the combination with a rotary conical mandrel having a longitudinal slot therein to receive the edge of a blank to be wound thereon, of a cutter for trimming a section from the base end of the wound cone while on the mandrel, a shearing device, operating in the same plane as the cutter, for clipping the edge portion of the blank lying in said slot, and automatic means for causing such inner edge portion of the severed section to move clear of the shearing device, whereby such severed section may be readily removed from the mandrel.

13. In a device for forming cones from sector shaped paper blanks, the combination with a rotary conical mandrel on which the blanks are wound, of a disk cutter mounted to move transversely past the small end of the mandrel and across the axis thereof so as to trim off the apex portion of the formed cone projecting beyond the same.

14. In a device for forming cones from sector shaped paper blanks, the combination with a rotary conical mandrel on which the blanks are wound, a disk cutter for trimming a section from the base end of the formed cone, and arranged to be driven by frictional contact therewith, of a second disk cutter mounted to move transversely past the small end of the mandrel so as to trim off the apex portion of the formed cone projecting beyond the same, means for simultaneously shifting said two cutters toward the axis of the mandrel, and means independent of the mandrel for rotating said second disk cutter.

15. In a device for forming cones from sector shaped paper blanks, the combination with a rotary conical mandrel on which the blanks are wound, of a disk cutter mounted to move transversely past the small end of the mandrel so as to trim off the apex portion of the formed cone projecting beyond the same, and means for impelling such apex portion downward when it has been severed.

16. In a device for forming cones from sector shaped paper blanks, the combination with a rotary conical mandrel on which the blanks are wound, of a cutter for trimming a section from the base end of the formed cone, a second cutter for trimming off the apex portion of the formed cone where it projects beyond the mandrel, and means for simultaneously moving said first cutter toward and against the mandrel and said second cutter past the small end of the mandrel, out of contact therewith.

17. In a device for forming cones from sector shaped paper blanks, the combination with a rotary conical mandrel on which the blanks are wound, of a cutter for trimming a section from the base end of the formed cone, a second cutter for trimming off the apex portion of the formed cone where it projects beyond the mandrel, means for simultaneously moving said first cutter into contact with the cone, so that it is frictionally driven thereby, and said second cutter past the small end of the mandrel, and an independent motor for driving said second cutter.

In testimony whereof I affix my signature.

PETER LE ROY McCALL.